United States Patent [19]

Croswhite

[11] 4,224,837

[45] Sep. 30, 1980

[54] FOUR SPEED OVERDRIVE POWER TRANSMISSION WITH BIDIRECTIONAL REACTION BRAKE BAND SERVO

[75] Inventor: Howard L. Croswhite, Livonia, Mich.

[73] Assignee: Ford Motor Company, Dearborn, Mich.

[21] Appl. No.: 966,977

[22] Filed: Dec. 6, 1978

[51] Int. Cl.² .................. F16H 47/08; F16H 57/10
[52] U.S. Cl. ........................................ 74/688; 74/763
[58] Field of Search .................... 74/688, 763, 789

[56] References Cited
U.S. PATENT DOCUMENTS

| 3,584,520 | 6/1971 | Borman | 74/688 X |
|---|---|---|---|
| 4,007,648 | 2/1977 | Bookout | 74/763 |

Primary Examiner—Husar C. J.
Assistant Examiner—Frank McKenzie

Attorney, Agent, or Firm—Donald J. Harrington; Keith L. Zerschling

[57] ABSTRACT

A four-speed transmission with an overdrive, high-speed ratio comprising multiple ratio torque transmitting gear elements wherein one gear element serves as a reaction element for intermediate speed operation as well as for overdrive operation with the direction of reaction torque distribution to a reaction element during intermediate speed ratio operation being opposite to the direction the reaction torque distributed to that same element during overdrive operation, and double acting brake servos for effecting optimum reaction braking for both intermediate speed operation and overdrive operation, the servos being hydraulically interconnected through a common shift valve circuit for timed engagement and release.

6 Claims, 3 Drawing Figures

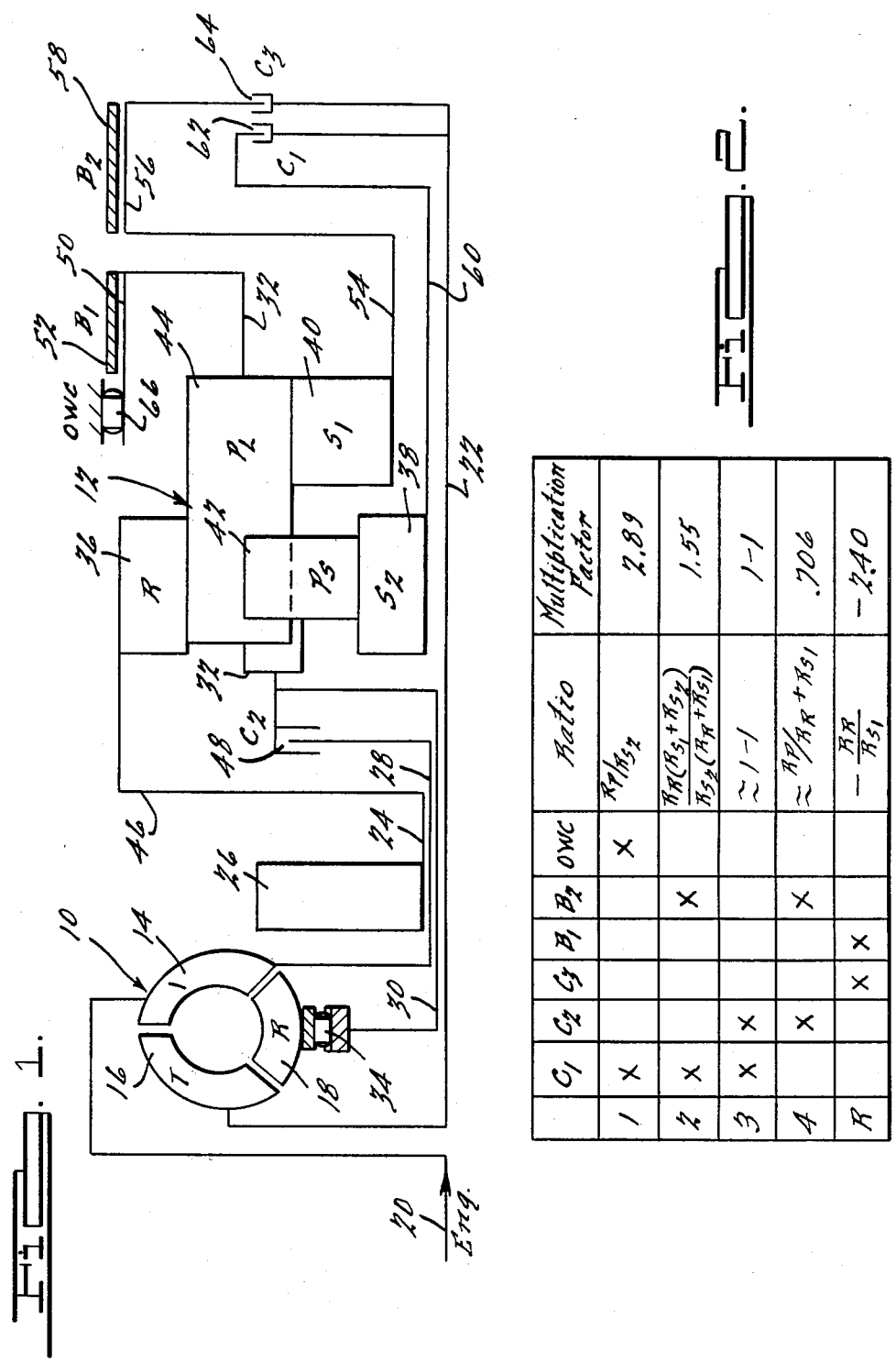

FOUR SPEED OVERDRIVE POWER TRANSMISSION WITH BIDIRECTIONAL REACTION BRAKE BAND SERVO

GENERAL DESCRIPTION OF THE INVENTION

My invention relates to improvements in multiple ratio overdrive transmissions of the type generally described in Konrad U.S. Pat. No. 3,491,617 and Egbert U.S. Pat. No. 3,314,307. Such transmission mechanisms include a hydrokinetic torque converter and a compound planetary gear system with pressure operated clutches and brakes for controlling the motion of the gear element to the gear system to effect three forward underdrive ratios and a fourth forward overdrive ratio as well as a single reverse ratio.

The gear system of Egbert and Konrad have a pair of sun gears, one of which has a larger pitch diameter than the other. It also has a single ring gear which serves as a power output element and a compound planetary system having a set of first planet pinions engageable with the smaller sun gear and a second set of planet pinions engageable with the larger sun gear, the planet pinions of one set drivably engaging the planet pinions of the other. Such an arrangement is capable of providing two forward underdrive ratios, a direct drive ratio and an overdrive ratio as well as a single reverse drive ratio. The larger sun gear serves as a reaction element during intermediate underdrive ratio operation as well as during overdrive operation, but the torque reaction acting upon the larger sun gear is in one direction during intermediate speed ratio operation and in the opposite direction during overdrive operation. It is possible to provide a single acting servo for operating a brake band to accomplish torque reaction for the larger sun gear, but the capacity of the servo must be increased to a value that is sufficient to effect braking of the larger sun gear when the torque reaction is in the direction that will not effect a self-energizing action.

Brake bands for automatic transmissions of this general type are capable of being self-energized when torque reaction occurs in one direction and the braking capacity is decreased when torque reaction occurs in the opposite. If the servo is designed for the capacity required for reverse drive operation, it has excess capacity to accommodate the torque reaction during intermediate speed forward operation. A harshness in the ratio shift from the low ratio to the intermediate ratio and from the direct drive third speed ratio to the intermediate ratio then is experienced. One way for overcoming this harshness in the ratio shift is to design the servo to meet the capacity requirements for reverse drive operation and to augment the control circuit pressure during reverse drive operation while distributing normal lower control pressure to the same servo during intermediate speed ratio operation. Such a control arrangement is shown, for example, in U.S. Pat. No. 3,095,755. Other schemes for controlling a self-energizing brake for effecting torque reaction in both directions include the use of two independently operated servos such as the ones shown in U.S. Pat. Nos. 2,701,630; 2,703,155 and 2,518,824.

The improvement of my invention makes it possible to use low servo pressure in the control circuit without increasing the servo size. This permits the use of a lower capacity pump which makes possible a compact gear arrangement and improved transmission efficiency. The servo is comprised of compound piston elements that are interconnected hydraulically and operated in timed sequence by reason of the action of common shift valves controlling ratio shifts between the low, intermediate, direct and overdrive ratios.

BRIEF DESCRIPTION OF THE FIGURES OF THE DRAWINGS

FIG. 1 shows in schematic form a multiple-ratio, hydrokinetic transmission mechanism capable of embodying the improvements of my invention.

FIG. 2 is a chart showing the brake and clutch engagement and release pattern for the clutches and brakes for accomplishing the four forward driving ratios and the single reverse ratio.

PARTICULAR DESCRIPTION OF THE INVENTION

Figure 3:
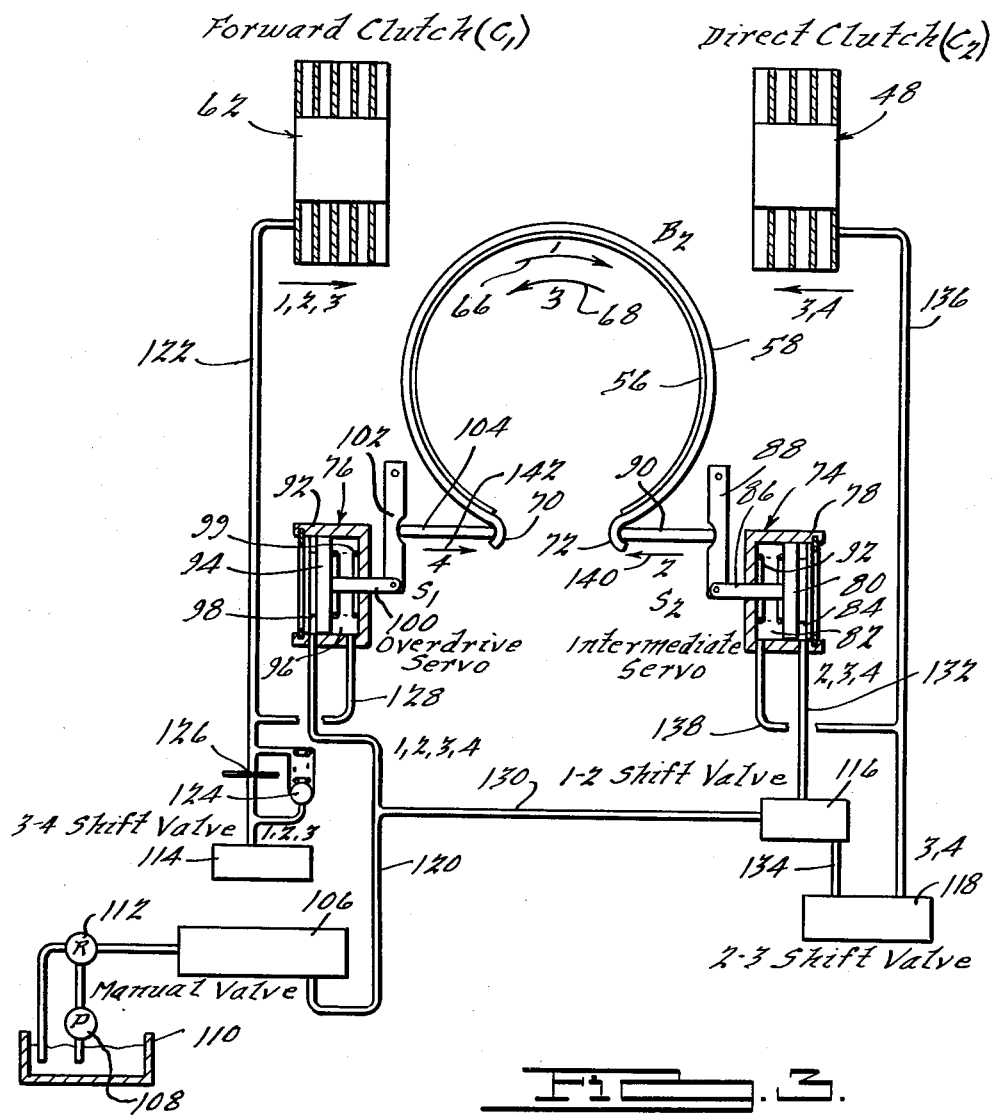
FIG. 3 is a schematic drawing of my improved compound servo system and the control valve circuit for controlling application and release of the reaction brake for the large sun gear of the FIG. 1 embodiment.

In FIG. 1 numeral 10 designates a hydrokinetic torque converter and numeral 12 designates a compound planetary gear system used with a torque converter. The converter 10 includes an impeller 14, a turbine 16 and a stator or reactor 18 which are arranged in fluid flow relationship in known fashion. The impeller 14 is connected drivably to the crankshaft 20 of an internal combustion engine in an automotive vehicle driveline.

The turbine 16 is connected drivably to turbine shaft 22, which in the arrangement shown extends concentrically through the center of the gear system. A power input shaft 24 is connected through a suitable final drive gear system or belt drive 26 to the traction wheels through a differential axle system, now shown. Output shaft 24 is in the form of a sleeve which surrounds the turbine shaft 22 and impeller driven shaft 28. A stator 18 is connected to a stator support sleeve shaft 30 which also surrounds the turbine shaft 22 and which is connected directly to compound carrier 32 of compound planetary gear system 12. An overrunning brake 34 is situated between the stator support 30 and the stator 18. The impeller and the stator are bladed in known fashion to provide a toroidal fluid flow during low speed operation.

The stator 18 is held stationary by the overrunning brake and the stator support sleeve 30 which is anchored as will be explained. During intermediate speed ratio operation the stator support 30 rotates with the carrier 32 in the direction of rotation of the impeller, thereby reducing the slip during intermediate speed ratio operation and providing a corresponding improvement in performance and efficiency during acceleration in the intermediate drive range. During operation in the third speed ratio the stator is allowed to freewheel in the direction of rotation of the impeller by reason of the operation of the overrunning brake 34. The converter 10 operates during high speed ratio operation in the coupling range.

The planetary gear unit 12 includes, in addition to the carrier 32, a ring gear 36, a small sun gear 38, a large sun gear 40, short planet pinions 42 and long planet pinions 44. Pinions 42 engage sun gear 38 and pinions 44. Sun gear 40 engages pinions 44 as does the ring gear 36. Ring gear 36 acts as a torque output element since it is connected through drive member 46 to the output shaft 24.

Impeller driven shaft 28 is adapted to be connected to the compound carrier 32 through a selectively engageable friction clutch 48.

Carrier 32 is connected to a brake drum 50. Brake band 52 surrounds the drum 50; and it is adapted to be applied and released by a fluid pressure operated brake servo, not shown. The brake servo can be of the conventional type as shown, for example, in U.S. Pat. No. 3,095,755. Sun gear 40 is connected to sleeve shaft 54 which, in turn, is connected to brake drum 56 which is surrounded by brake band 58. Brake band 58 is applied and released by the compound servo system that will be described with reference to FIG. 3.

The small sun gear 38 is connected to sun gear sleeve shaft 60, which is adapted to be clutched to turbine driven shaft 22 by means of selectively engageable friction clutch 62. Brake drum 56 is adapted to be connected to the turbine driven shaft 22 through a selectively engageable friction clutch 64. The clutches 62 and 64 conveniently can be located on the right-hand side of the compound planetary gear system 12.

To accomplish a nonsynchronous shift from the low ratio to the intermediate ratio, overrunning brake 66 is provided. This brake can be used to distribute reaction torque from the carrier 32 to the transmission housing, not shown, during acceleration. The brake band 52 is applied during reverse drive operation and during coasting. Thus it is necessary to design the brake servo for the brake band 52 to accommodate torque reaction in a single direction, which is the direction that will achieve this self-energizing reaction.

The clutches and brakes are identified by symbols $C_1$, $C_2$, $C_3$, $B_1$, $B_2$ and OWC in the chart of FIG. 2. These symbols correspond respectively to clutch 62, clutch 48, clutch 64, brake band 52 and brake band 58 and overrunning clutch 66. During low speed ratio operation the overrunning clutch distributes torque to the stationary transmission housing as clutch 62 is applied. A ratio change is achieved by keeping the clutch 62 applied and applying brake band 58, thus causing the large sun gear 40 to act as a reaction element. A ratio change to the direct drive ratio is achieved by engaging simultaneously the clutch 62 and the clutch 48 and releasing both brake bands. Overdrive operation is achieved by engaging clutch 48 and brake band 58 and releasing clutch 62, clutch 64 and brake band 52.

Reverse drive is achieved by engaging simultaneously clutch 64 and brake band 52 as brake band 58 and clutches 62 and 48 are released.

During low speed ratio operation turbine torque is distributed through the clutch 62 to the sun gear 38. The carrier 32 acts as a reaction member and is held stationary by the overrunning brake or the brake band 52. This causes the ring gear 36 and the output shaft to be driven at the ratio indicated in FIG. 2. At that time the stator support 30 is held stationary.

During a ratio change to the intermediate ratio the turbine continues to drive the sun gear 38, but the ring gear is speeded up because the sun gear 40 now acts as a reaction element, which drives the carrier but at a reduced speed. This causes the reactor or stator 18 to rotate in a direction that will cause a decrease in the slip of the converter 10, which improves the performance and overall efficiency of the driveline.

Direct drive operation is achieved by engaging both clutches 62 and 48. This locks all of the elements of the gear system together for rotation in unison. At that time the stator and the impeller also rotate in unison until a hydrokinetic coupling condition is achieved. Since the stator is driven by the overrunning brake 34 at the same speed of rotation as the speed of the stator support 30 until the coupling point is reached.

During overdrive operation the clutch 64 is applied as is the brake band 58; thus a direct mechanical connection is established between the crankshaft 20 and the output shaft 24. The hydrokinetic unit is then active during overdrive operation.

In the schematic drawing of FIG. 3 directional arrows 66 and 68 indicate the direction of freewheeling motion of the brake drum 56 during low speed ratio operation and during direct drive operation. Brake drum 56 is braked, as explained previously, during second speed ratio operation and during fourth ratio overdrive operation. The brake band 56 has two so-called active ends 70 and 72, which also serve as reaction points depending upon the direction of rotation of the brake drum 56. An intermediate speed ratio brake servo is schematically shown at 76. Servo 74 comprises a cylinder 78 and a cooperating piston 80, the piston and cylinder defining opposed fluid pressure chambers 82 and 84. The piston includes a piston rod 86, which is connected to brake band end 72 through a suitable force multiplying linkage 88 and a brake band strut 90. Spring 92 acts against the piston 80 to urge normally the piston to the brake release position.

The overdrive brake band servo 76 is similar to the servo 74 which comprises a cylinder 92 and a piston 94 which cooperate to define two opposed fluid pressure working chambers 96 and 98. Spring 99 urges the piston 94 to a brake release position. The piston is connected to the operating end 70 of the brake band 58 through piston rod 100, force multiplying linkage 102 and brake band strut 104.

In the schematic control circuit of FIG. 3 a driver controlled manual valve 106 is adjustable by the vehicle operator to produce any one of several drive ranges including a fully automatic drive range, which is the drive range that will be described in the following paragraphs.

The transmission includes a pump 108 which is connected to a power input element of the transmission. The low pressure side of the pump communicates with a reservoir 110, which may be the transmission sump. The pump 108 supplies control pressure to the manual valve 106. The magnitude of the pressure is regulated by pressure regulated valve 112.

Ratio changes between the third speed ratio and the overdrive ratio are controlled by 3–4 shift valve 114 and corresponding ratio changes between the low speed ratio and the intermediate speed ratio are controlled by 1–2 shift valve 116. Ratio changes between the intermediate speed ratio and the third speed, direct drive ratio are controlled by a 2–3 shift valve 118.

Fluid passage 120 connects the manual valve with the apply side of the servo 76. Passage 120 is pressurized by the manual valve during each of the four forward driving ratios. Thus the pressure chamber 98 is continuously pressurized for each of the four forward driving ratios.

The manual valve distributes control pressure to the 3–4 shift valve which in turn distributes control pressure through passage 122 to the forward drive clutch 62. Clutch 62 is pressurized during operation in the first, second and third forward driving ratios. When it is deactivated during overdrive ratio, passage 122 becomes exhausted through the 3-4 shift valve. Pressure distribution to the clutch 62 takes place through the one way check valve 124 during clutch application, and pressure is exhausted from clutch 62 through orifice 126 when the 3-4 shift valve moves to the overdrive ratio position. Pressure chamber 96 is pressurized by the passage 122 which communicates with it through passage 128.

Pressurized passage 120 supplies fluid through communicating passage 130 to the 1-2 shift valve. The 1-2 shift valve in turn distributes pressure to passage 132 whenever it assumes the upshift or the second speed ratio position. It pressurizes passage 132 also when it assumes either of the two higher speed ratio positions; that is, the direct drive position or the overdrive position. The 1-2 shift valve distributes pressure also to passage 134 which communicates with the 2-3 shift valve 118. Passage 134 is pressurized whenever the 1-2 shift valve assumes a second speed ratio upshift position.

The outlet side of the 2-3 shift valve communicates with passage 136 which extends to the direct drive clutch 48. Passage 136 and the clutch 48 are pressurized whenever the 2-3 shift valve assumes the upshift or third speed ratio position. Passage 136 is pressurized also during overdrive operation. Passage 136 communicates with the release side of the servo 74; namely, the pressure chamber 82, through branch passage 138.

When both sides of the servos 76 are pressurized, the spring 100 moves the overdrive servo to a brake release position. Similarly, when both sides of the servo 74 are pressurized, spring 92 moves the intermediate servo to the brake release position.

The forward clutch is pressurized in the first, second and third gear drive ranges through the 3-4 shift valve and the check valve 124. The forward clutch feed passage 122 pressurizes also the release side of the overdrive servo. When a shift occurs from the direct drive range to the overdrive range, the 3-4 shift valve will exhaust the forward clutch feedline 122 through the orifice; and since the manual valve feeds the apply side of the forward drive servo through passage 120, the overdrive servo will apply the band in fourth gear ratio only.

The direct drive clutch 48 is pressurized through the 2-3 shift valve when the 2-3 shift valve assumes the third speed ratio position. The release side of the intermediate servo and the direct drive clutch feed passage 136 are in communication. Therefore, since the apply side of the intermediate servo is pressurized through the 1-2 shift valve in the second speed ratio position, the band 56 will be applied during second drive range operation only.

During operation in the overdrive range, the brake band end 72 acts as a reaction point and during operation in the intermediate speed ratio, the brake band end 70 acts as a reaction point.

Band rotation is in the direction of the arrow 66 during low speed ratio operation. The application of a force to the brake band end in the direction of the arrow 140 will achieve a self-energizing action during braking operation in the intermediate speed ratio drive condition. Similarly, since the brake band rotation during third speed operation is in the direction of the arrow 68, application of the overdrive brake servo force in the direction of the arrow 142 will produce a self-energizing action during overdrive operation following a shift from the third speed ratio to the fourth speed ratio.

Having thus described a preferred embodiment of my invention, what I claim and desire to secure by U.S. Letters Patent is:

1. A power transmission mechanism for distributing torque from a driving member to a driven member comprising a hydrokinetic torque converter and multiple ratio gearing, a power output element of said gearing being connected to a driven member, clutch and brake means for controlling relative motion of the elements of said gearing to establish plural torque delivery paths, said converter comprising an impeller connected to said driving member, a turbine and a stator, first clutch means for connecting said turbine to a first torque input element of said gearing, second clutch means for connecting said impeller to a second torque input element of said gearing, first brake means for anchoring a reaction element of said gearing during low speed ratio operation, said stator being connected to said reaction element whereby said stator is adapted to accommodate hydrokinetic torque reaction of said converter during low speed ratio operation, and second brake means for anchoring an element of said gearing to establish a second reaction element during intermediate speed ratio operation whereby said first reaction element is driven at a reduced speed relative to the speed of said impeller, thus causing said stator to rotate in the direction of rotation of said impeller to establish a reduced hydrokinetic slip condition.

2. A power transmission mechanism for distributing torque from a driving member to a driven member comprising a hydrokinetic torque converter and multiple ratio gearing, a power output element of said gearing being connected to a driven member, clutch and brake means for controlling relative motion of the element of said gearing to establish plural torque delivery paths, said converter comprising an impeller connected to said driving member, a turbine and a stator, first clutch means for connecting said turbine to a first torque input element of said gearing, second clutch means for connecting said impeller to a second torque input element of said gearing, first brake means for anchoring a reaction element of said gearing during low speed ratio operation, said stator being connected to said reaction element whereby said stator is adapted to accommodate hydrokinetic torque reaction of said converter during low speed ratio operation, and second brake means for anchoring an element of said gearing to establish a second reaction element during intermediate speed ratio operation whereby said first reaction element is driven at a reduced speed relative to the speed of said impeller, thus causing said stator to rotate in the direction of rotation of said impeller to establish a reduced hydrokinetic slip condition, and second clutch means for connecting said impeller to said first reaction element as said second brake means is applied thereby establishing an overdrive ratio.

3. A power transmission mechanism comprising multiple ratio gearing and a hydrokinetic torque converter, said converter comprising an impeller, a turbine and a stator, said impeller being connected to a driving member, power output element of said gearing being connected to a driven member, said gearing comprising a first sun gear and a second sun gear, the pitch diameter of the former being greater than the pitch diameter of the latter, a driven member, a ring gear connected to said driven member, a compound planet pinion assembly comprising first planet pinions engageable with said second sun gear, second planet pinions engageable with said first sun gear, said planet pinions being engaged with each other, a carrier for journalling said planet pinions, clutch means for connecting said second sun gear to said turbine during operation in a first, second and third forward driving ratio, brake means for anchoring said carrier during operation in a first speed ratio, second brake means for anchoring said first sun gear during operation in a second speed ratio and a fourth overdrive ratio, second clutch means for connecting said impeller to said carrier during operation in overdrive ratio and third clutch means for connecting said turbine to said first sun gear during operation in a direct drive ratio, said second brake means comprising a brake band, a brake drum within said brake band connected to said first sun gear, fluid pressure operated servo means comprising an overdrive servo portion and an intermediate servo portion, a pressure source, a control valve circuit connecting said pressure source to said overdrive servo portion and said intermediate servo portion for selectively energizing the same to establish a braking force on said brake band in one direction to establish a self-energizing braking action during second speed ratio operation as the overdrive servo portion acts as a reaction point, said overdrive servo portion applying a brake actuating force on said brake band in the opposite direction to establish a self-energizing braking action during third speed ratio operation as said intermediate servo portion acts as a reaction point.

4. The combination as set forth in claim 3 wherein said stator is connected to said carrier whereby said stator is anchored to accommodate hydrokinetic torque reaction during operation in the first speed ratio and for establishing a low slip driving relationship in said converter during second speed ratio operation.

5. The combination as set forth in claim 3 wherein each servo portion comprises a brake band apply pressure chamber and a brake band release pressure chamber, said valve circuit comprising also a 1-2 shift valve, a 2-3 shift valve and a 3-4 shift valve for distributing respectively pressure from said source to the release side of said intermediate servo portion following a shift to the intermediate speed ratio condition, for exhausting pressure from the release side of the overdrive servo portion while the apply side of the overdrive servo portion is continuously pressurized and for distributing pressure to the release side of the intermediate servo portion upon a ratio change from the intermediate ratio to the direct drive ratio.

6. The combination as set forth in claim 4 wherein each servo portion comprises a brake band apply pressure chamber and a brake band release pressure chamber, said valve circuit comprising also a 1-2 shift valve, a 2-3 shift valve and a 3-4 shift valve for distributing respectively pressure from said source to the release side of said intermediate servo portion following a shift to the intermediate speed ratio condition, for exhausting pressure from the release side of the overdrive servo portion while the apply side of the overdrive servo portion is continuously pressurized and for distributing pressure to the release side of the intermediate servo portion upon a ratio change from the intermediate ratio to the direct drive ratio.

* * * * *